United States Patent

Hanson

[15] 3,695,101
[45] Oct. 3, 1972

[54] LIFT-BALANCING DEVICE
[72] Inventor: Perry W. Hanson, Hampton, Va.
[73] Assignee: The United States of America as represented by the Administrator of the National Aeronautics and Space Administration
[22] Filed: Sept. 8, 1970
[21] Appl. No.: 70,032

[52] U.S. Cl. .................................................. 73/147
[51] Int. Cl. .............................................. G01m 9/00
[58] Field of Search ............................... 73/147, 148

[56] References Cited

UNITED STATES PATENTS

| 3,240,059 | 3/1966 | Kiel | 73/147 |
| 3,276,251 | 10/1966 | Reed | 73/147 |
| 2,331,304 | 10/1943 | Carmody | 73/147 |

Primary Examiner—S. Clement Swisher
Attorney—Howard J. Osborn and John R. Manning

[57] ABSTRACT

A static force balancing system attached to a lifting body flying on a free-flight suspension system in a wind tunnel which balances the static lift forces generated in excess of lifting body weight while permitting freedom of movement of the lifting body in response to dynamic forces. The static lift forces are balanced by the flow of pressurized air against a piston sliding loosely in a casing. Friction between piston and casing is essentially eliminated by a portion of the pressurized air leaking past the piston. Force variation with piston position is essentially eliminated by providing a pressure reservoir connected to the casing which acts as an accumulator.

11 Claims, 1 Drawing Figure

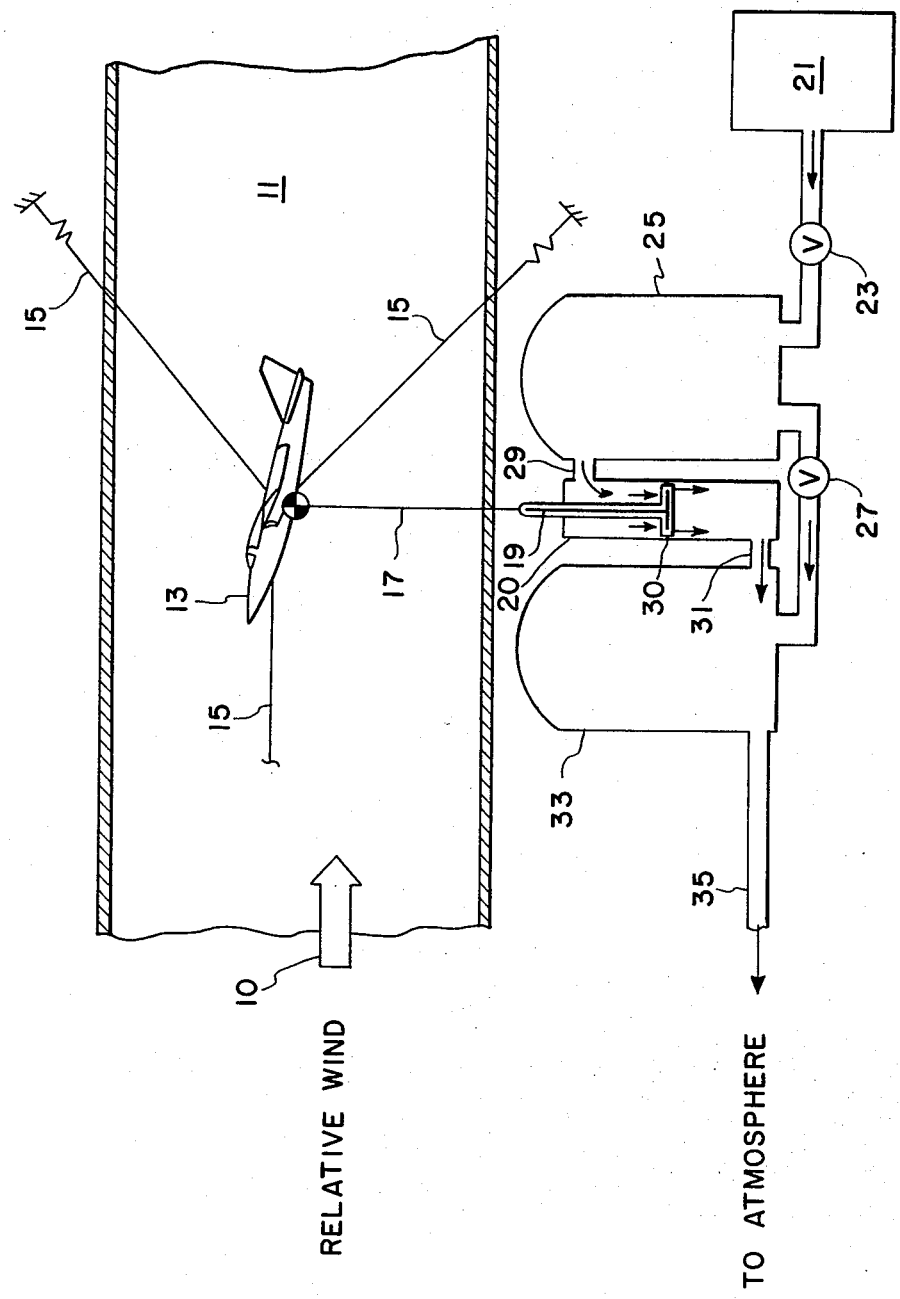

LIFT-BALANCING DEVICE

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

This invention relates to a force balancing device and more particularly to a support system which balances static lift forces produced by a lifting body flying in a wind tunnel in excess of lifting body weight permitting free response to dynamic forces acting on the lifting body. Dynamic stability and aeroelastic response testing of spacecraft and aircraft is presently performed in wind tunnels with flying models having a free-flight suspension system as described in U.S. Pat. No. 3,276,251. The free-flight suspension system described in the above patent is designed for 1g level flight conditions. Therefore, testing can be accomplished only when the model is producing lift equal to its own weight. In maneuvering, however, aircraft or spacecraft may produce high lift, greater than the weight of the aircraft or spacecraft. In order to conduct tests of wind tunnel models flying at high g maneuvering flight conditions on a free-flight suspension system, it was necessary to design a static force balancing system which would balance out the lift produced in excess of model weight. In order to obtain meaningful data, restraints placed on the model by the force balancing system in excess of the lift balanced must necessarily be minimal. That is to say that static lift forces in excess of model weight must be balanced by the force balancing system without influencing model response to dynamic forces.

SUMMARY OF INVENTION

The static lift balancing system consists of a piston sliding loosely within a casing and connected to the lifting body by a linkage. The linkage consists of a rigid rod extending from the piston to a point exterior to the casing and a flexible cable extending from the rigid rod to the point of attachment on the model. Controlled, pressurized air is directed into the casing and against the piston creating a force which balances static lift in excess of model weight. A portion of the pressurized air is permitted to leak past the sides of the piston essentially eliminating friction between the piston and the casing wall. The pressurized air flows into the casing through a pressure reservoir which serves as an accumulator. Since the volume of the pressure reservoir is large in comparison to the volume of the casing, the pressure reservoir absorbs pressure changes, and therefore force changes, which are caused by movement of the piston within the casing. Valves are provided to control the flow of pressured air into the reservoir and to allow the escape of excess air from the pressure reservoir. Both the air that leaks past the piston and the excess air escaping from the pressure reservoir are exhausted into the atmosphere through an exhaust buffer tank.

Accordingly, it is an object of the invention to provide a static force balancing system for a lifting body flying in a wind tunnel test section and subject to dynamic and static lift forces acting through the center of gravity of the lifting body. The device will balance static forces without damping dynamic forces. The invention will support the flying model near the center of the wind tunnel test section and will permit The lifting body to oscillate in response to dynamic forces.

BRIEF DESCRIPTION OF THE DRAWING

A more complete appreciation of the invention and many of the attendant advantages thereof will be readily apparent as the same becomes better understood by reference to the following detailed description when considered in connection with the accompanying drawing wherein:

The FIGURE is a schematic view of the novel lift-balancing device.

DESCRIPTION OF THE PREFERRED EMBODIMENT

Referring now to the FIGURE, there is shown a wind tunnel test section 11 employing a relative wind 10 for the testing of body lifting body 13. Body 13 is supported by the normal free-flight cable support system 15 which is fully described in the U.S. Pat. No. 3,276,251 and by a lift-balancing cable 17. Lift-balancing cable 17 is connected to a piston 19 which is housed in a casing 20. Pressurized air from a source of pressured air 21 passes through an inlet valve 23 into a pressure reservoir 25. Pressure in pressure reservoir 25 is maintained at the desired level by the concerted operation of inlet valve 23 and exhaust valve 27. Air from the reservoir passes through pressure inlet valve 29 into casing 20 where it exerts a pressure force against piston 19. Some of this pressurized air is permitted to leak past piston 19 through a clearance 30 between the piston and the casing wall. Clearance 30 is formed by the loose fit of piston 19 within casing 20. Air leaking past piston 19 enters exhaust buffer tank 33 through line 31 and is exhausted into the atmosphere, together with the air passing through exhaust valve 27, through line 35.

OPERATION

The operation of the present invention is now believed apparent. Lifting body 13 will fly in wind tunnel test section 11 restrained only by a free-flight suspension system 15 provided that the lift produced equals the weight of the body 13. When it is desired to test body 13 in a higher lift configuration simulating maneuvering flight, the novel lift balancing support system must be used. A flexible lift balancing cable 17 is attached to the body near its center of gravity and to a piston 19 in the casing 20. As lift increases on body 13, inlet valve 23 is opened allowing pressurized air from source 21 to pass into casing 20 through pressure reservoir 25 and pressure inlet line 29. Inlet valve 23 is manipulated to control the pressure acting against piston 19 so as to balance the lift produced by lifting body 13 in excess of the weight of the lifting body.

Lifting body 13 may be raised or lowered in the tunnel test section 11 through the opening and closing of inlet valve 23 or exhaust valve 27. Opening inlet valve 23 alone when body 13 is in stable flight will result in a descent of body 13 toward the floor of wind tunnel test section 11 as the force acting on the piston 19 becomes greater then the excess lift force. Opening valve 27 alone with body 13 in stable flight will cause body 13 to rise toward the top of the wind tunnel test section 11 as the excess lift force exceeds the force acting on piston 19. With inlet valve 23 and exhaust valve 27 in the open or partially open position, closing either valve alone will effect a resultant lifting body displacement (up or down) which is directly opposite to that caused by opening the valve.

During normal testing, inlet valve 23 and exhaust valve 27 are manipulated as pressure regulators to keep lifting body 13 in the center of the wind tunnel test section 11. A portion of the pressurized air entering casing 20 leaks past piston 19 through clearance 30 between piston 19 and the walls of casing 20 and essentially eliminates friction between piston 19 and casing 20. Since the volume of pressure reservoir 25 is large in comparison to that of casing 20, pressure changes caused by movement of piston 19 within casing 20 are essentially absorbed by pressure reservoir 25 which acts as an accumulator allowing piston 19 to move within casing 20 with negligible change in force due to body motion. Thus piston 19 is free to oscillate in casing 20 in response to random external forces and body structural vibrations and dynamic stability phenomena, such as dutch roll, can affect the body with minimum dynamic restraint from the lift-balancing support system. Pressurized air passing through exhaust valve 27 or leaking around piston 19 enters exhaust buffer tank 33 and is exhausted into the atmosphere through line 35. It is thus seen that the present invention balances the lift produced by a lifting body flying in a wind tunnel in excess of lifting body weight while leaving the body free to move in response to dynamic forces.

Although the invention has been described and illustrated in detail on a specific embodiment thereof, it is to be understood that this description is by way of illustration only and is not to be taken as limiting upon applicant's invention. Obviously, there are many modifications and variations of the present invention possible in the light of the above teachings. Several tanks may be used as pressure reservoirs and any pressurized gas may be used in lieu of pressurized air. Casing 20 may be designed with stops limiting the travel of piston 19 to prevent lifting body 13 from exceeding prescribed limits of motion. Materials used in construction are those normally used for pressure vessels and lines.

What is claimed as new and desired to be secured by Letters Patent of the United States is:

1. A force balancing device comprising: a movable member acted upon by both static and dynamic forces; a static force balancing system for said movable member including a casing member, means for transmitting a force housed within said casing member, linkage means connecting said movable member with said means for transmitting a force, a source of pressurized gas, means for controlling the flow of said pressurized gas against said means for transmitting a force, means permitting a portion of the pressurized gas to leak past said means for transmitting a force and accumulator means connected to said casing member, said accumulator means absorbing pressure changes in said casing member caused by movement of said means of transmitting a force, said movement being caused by dynamic forces acting upon said movable member, whereby the flow of pressurized gas against and past said means for transmitting a force balances said static forces and holds said movable member in an equilibrium position as to said static forces while allowing said movable body to move freely in response to said dynamic forces.

2. The device of claim 1 wherein the means permitting a portion of said pressurized gas to leak past said means for transmitting a force is the design of said means for transmitting a force, said means for transmitting a force having a cross-section smaller than that of said casing member providing a clearance between said casing member and said means for transmitting a force, whereby the leakage portion of said pressurized gas escapes through said clearance and essentially eliminates friction between said casing member and said means for transmitting a force.

3. The device of claim 1 wherein said accumulator means consists of at least one pressure reservoir having a volume which is large in comparison to the volume of said casing member.

4. The device of claim 1 wherein the movable member is a lifting body flying in a wind tunnel restrained by a free-flight suspension system and by said static force balancing system.

5. The device of claim 1 wherein the movable member is a lifting model flying in a wind tunnel, restrained by a free-flight suspension system and by said static force balancing system, said means for transmitting a force is a piston sliding loosely within said casing member, said means permitting a portion of the fluid to leak past said piston is a clearance between said piston and said casing member, said linkage means is a rigid rod extending from said piston to a point exterior said casing member and a flexible cable extending from said push rod to said lifting model, and said accumulator means includes at least one pressure reservoir connected to said casing member and having a volume large in comparison with said casing member for absorbing pressure changes in said casing member caused by piston movement in response to dynamic forces acting on the lifting mode.

6. The device of claim 1 wherein said means for controlling the flow includes inlet means connecting said source of pressurized gas with said accumulator means, said inlet means for admitting a controlled amount of said pressurized gas into said accumulator means and exhaust means attached to said accumulator means, said exhaust means for releasing controlled amounts of said pressurized gas from said accumulator means, whereby said inlet means and said exhaust means operate in concert to control the flow of gas against the means for transmitting a force.

7. The device of claim 1 wherein the linkage means includes a rigid member extending from the means for transmitting a force to a point exterior to said casing and a flexible member extending from the rigid member to the movable member.

8. A force balancing device comprising:
a movable member mounted for maneuvering in an air stream acted upon by both static and dynamic forces;
a static force balancing system for said movable member including a casing member, means for transmitting a force housed within said casing member, linkage means for connecting said movable member with said means for transmitting a force, said linkage means including a rigid member extending from the means for transmitting a force to a point exterior said casing member and a flexible member extending from the rigid member to the movable member, a source of pressurized gas, means for controlling the flow of said pressurized gas against said means for transmitting a force, and means permitting a portion of the pressurized gas to leak past said means for transmitting a force, whereby the flow of pressurized gas against and past said means for transmitting a force balances said static forces and holds said movable member in an equilibrium position as to said static forces while allowing said movable body to move freely in response to said dynamic force.

9. The device of claim 8 wherein the rigid member is a rod and the flexible member is a cable.

10. A method for balancing static forces acting on a movable body while leaving the movable body free to move in response to dynamic forces comprising the steps of:
   a. providing a movable body mounted for maneuvering in an air stream being acted upon by static and dynamic forces;
   b. connecting said movable body by a flexible linkage to a force transmitting means contained in a casing member;
   c. controllably directing pressurized gas from a source of said gas against said force transmitting means creating a force which balances said static forces acting upon said movable member;
   d. permitting a portion of said pressurized gas to leak past said force transmitting means; (e) controlling the amount of gas that leaks past said force transmitting means; whereby the static forces acting on a movable body are balanced while leaving the movable body free to respond to dynamic forces.

11. The method of claim 10 including the step of accumulating pressurized gas from said source of pressurized gas and from said casing member to absorb pressure changes in said casing member caused by movement of said force transmitting means and wherein the step of permitting includes providing a clearance between said force transmitting means and said casing member for the leakage of said pressurized gas.

* * * * *